United States Patent
Bullock et al.

(10) Patent No.: US 12,522,300 B2
(45) Date of Patent: *Jan. 13, 2026

(54) COMPOSITE FLOORING FOR RECREATIONAL VEHICLES

(71) Applicant: Thor Tech, Inc., Elkhart, IN (US)

(72) Inventors: Mark Bullock, Elkhart, IN (US); Jon Brock, Warsaw, IN (US); Jeff Snyder, White Pigeon, MI (US)

(73) Assignee: Thor Tech, Inc., Elkhart, IN (US)

( * ) Notice: Subject to any disclaimer, the term of this patent is extended or adjusted under 35 U.S.C. 154(b) by 422 days.

This patent is subject to a terminal disclaimer.

(21) Appl. No.: 18/191,321

(22) Filed: Mar. 28, 2023

(65) Prior Publication Data
US 2023/0234647 A1 Jul. 27, 2023

Related U.S. Application Data

(63) Continuation-in-part of application No. 17/836,207, filed on Jun. 9, 2022, now Pat. No. 11,634,184, which
(Continued)

(51) Int. Cl.
| | | |
|---|---|---|
| *B62D 25/20* | (2006.01) | |
| *B32B 5/18* | (2006.01) | |
| *B32B 7/12* | (2006.01) | |
| *B32B 27/06* | (2006.01) | |
| *B62D 29/04* | (2006.01) | |

(52) U.S. Cl.
CPC ............ *B62D 25/2009* (2013.01); *B32B 5/18* (2013.01); *B32B 7/12* (2013.01); *B32B 27/065* (2013.01); *B62D 25/20* (2013.01); *B62D 29/04* (2013.01); *B32B 2262/101* (2013.01); *B32B 2307/558* (2013.01); *B32B 2307/712* (2013.01); *B32B 2471/00* (2013.01); *B32B 2605/003* (2013.01)

(58) Field of Classification Search
CPC ......... B62D 25/20–25/2072; B32B 5/00–5/32; B32B 3/00–3/30
See application file for complete search history.

(56) References Cited

U.S. PATENT DOCUMENTS

| | | | | |
|---|---|---|---|---|
| 3,969,563 A | * | 7/1976 | Hollis, Sr. ................ | E04C 2/34 428/920 |
| 6,030,483 A | | 2/2000 | Wilson | |
| (Continued) | | | | |

FOREIGN PATENT DOCUMENTS

| | | | | |
|---|---|---|---|---|
| CN | 205818540 U | 12/2016 | | |
| DE | 102007039126 A1 | * 2/2009 | ............ | B29C 70/46 |
| (Continued) | | | | |

OTHER PUBLICATIONS

Machine translation of DE102007039126. Retrieved Jul. 22, 2025.*
(Continued)

*Primary Examiner* — Prashant J Khatri
(74) *Attorney, Agent, or Firm* — DINSMORE & SHOHL LLP

(57) ABSTRACT

A laminated panel is provided comprising a skeletal framework, foam core inserts, an impact resistant sheet, and a weather resistant sheet bonded together with adhesive. Recreational vehicles incorporating such panels are also contemplated, as are methods of making the composite laminated panel.

22 Claims, 4 Drawing Sheets

Related U.S. Application Data is a continuation of application No. 16/815,780, filed on Mar. 11, 2020, now Pat. No. 11,383,768.

(60) Provisional application No. 62/817,238, filed on Mar. 12, 2019.

(56) References Cited

U.S. PATENT DOCUMENTS

| | | | |
|---|---|---|---|
| 8,757,704 | B2 | 6/2014 | Zhao et al. |
| 11,383,768 | B2 | 7/2022 | Bullock |
| 2014/0227928 | A1 | 8/2014 | Ehbing et al. |
| 2017/0113434 | A1 | 4/2017 | McCloud et al. |

FOREIGN PATENT DOCUMENTS

| | | |
|---|---|---|
| DE | 102015107939 A1 | 8/2016 |
| EP | 3210864 A1 | 8/2017 |

OTHER PUBLICATIONS

International Search Report and Written Opinion pertaining to PCT/US2020/022011, dated Jun. 17, 2020.
CompositeWorld "New Reinforced Thermoplastic Laminate Enables Build of All-Composite RV Trailer" https://www.compositesworld.com/news/new-reinforced-thermoplastic-laminate-enables-build-of-all-composite-rv-trailer, 2008, 3 pgs.
Mitsubishi Chemical Advanced Materials Composites, Test Report, SL Bond F03S03-2.7, 2019, 1 pg.
RVBusiness "Pilgrim Unveils Seamless Composite Flooring" https://rvbusiness.com/pilgrim-unveils-seamless-composite-flooring/, 2007, 4 pgs.
Tekmodo "FX8 Structural Composite Panel™ Technical Data Sheet", 2019, 2 pgs.
EP Communication pursuant to Article 94(3) EPC dated Dec. 13, 2023 pertaining to EP application No. 20717039.0 filed Oct. 6, 2021, pp. 1-6.

\* cited by examiner

COMPOSITE FLOORING FOR RECREATIONAL VEHICLES

CROSS-REFERENCE TO RELATED APPLICATIONS

This application is a continuation-in part of U.S. patent application Ser. No. 17/836,207 filed Jun. 9, 2022, which is a continuation of U.S. patent application Ser. No. 16/815,780 filed Mar. 11, 2020, now U.S. Pat. No. 11,383,768, which claims the benefit of U.S. Provisional Application No. 62/817,238, filed Mar. 12, 2019, which are incorporated by reference herein in their entirety.

BACKGROUND

The present disclosure is directed to recreational vehicles including, but not limited to trailers and mobile homes.

BRIEF SUMMARY

The present disclosure is directed to composite laminated panels for use in the construction of floors, walls, ceilings and other portions of recreational vehicles and, in one embodiment, to an improved flooring system made of composite laminated panels for use in recreational vehicles. Conventional flooring systems are wood-based and, upon exposure to moisture, are susceptible to rotting, swelling, odor development, discoloration, or formation of mold. The present inventors have formulated a composite flooring that meets the requirements of automotive and/or commercial grade compressive strength and point load strength, as applicable for recreational vehicles that is not susceptible to rotting, swelling, odor development, discoloration, or formation of mold.

The improved flooring system of the present disclosure, which does not make substantial use of wood products, may be conveniently secured to or otherwise installed over the chassis or other frame components of recreational vehicles. The composite laminated panels of the improved flooring system may also be conveniently installed with a seamless construction and employ materials that provide fastener retention properties that are comparable to those provided by conventional wood-based flooring systems, which typically include Lauan, Plyveneer, and other wood-based products.

In accordance with one embodiment of the present disclosure, a recreational vehicle comprises a chassis, at least one axle assembly, a vehicle body, and a composite floor. The vehicle body and the composite floor are supported by the chassis. The axle assembly is coupled to the chassis and provides motive support and underbody clearance to the chassis. The composite floor comprises a skeletal framework, a plurality of foam core inserts, an impact resistant sheet on an interior side of the composite floor, a weather resistant sheet on an exterior side of the composite floor, a plurality of contained framework cells, and a structural adhesive. The skeletal framework of the composite floor comprises a plurality of closed frame sections defined by frame segments of the skeletal framework. Each contained framework cell is bounded volumetrically by frame segments of a closed frame section, portions of the impact resistant sheet, and portions of the weather resistant sheet. Each of the foam core inserts is large enough to frictionally engage at least two parallel frame segments of a closed frame section of the skeletal framework. Each contained framework cell is packed with one or more of the foam core inserts and the foam core inserts within each cell collectively occupy a substantial entirety of the contained framework cell. The structural adhesive is arranged to bond the skeletal framework, the foam core inserts, the impact resistant sheet, and the weather-resistant sheet as a structurally integrated composite floor where a force exerted on the impact resistant sheet in a direction of a contained framework cell encounters resistance that is collectively attributable to one or more of the foam core inserts, one or more of the frame segments of the skeletal framework, and the weather resistant sheet, such that a collective modulus of elasticity (MOE) of the composite floor comprises modulus components that are attributable to the skeletal framework, the foam core inserts, the impact resistant sheet, and the weather resistant sheet.

In accordance with another embodiment of the present disclosure, a method of making a composite floor comprises forming a skeletal framework by assembling a plurality of closed frame sections defined by frame segments, inserting one or more foam core inserts into each of the closed frame sections of the skeletal framework, providing an impact resistant sheet and a weather resistant sheet, each sheet having an internal side and an external side, applying a structural adhesive to the internal side of the impact resistant sheet and contacting the impact resistant sheet with the skeletal framework and foam core inserts, applying the structural adhesive to the internal side of the weather resistant sheet and contacting the weather resistant sheet with the skeletal framework and foam core inserts, enclosing a composite floor assembly comprising the skeletal framework, foam core inserts, structural adhesive, impact resistant sheet, and weather resistant sheet in a vacuum bag assembly, evacuating the vacuum bag assembly of air to compress the composite floor assembly, maintaining a vacuum environment in the vacuum bag assembly to bond each of the impact resistant sheet and the weather resistant sheet to the skeletal framework and foam core inserts, returning air to the vacuum bag assembly, and removing the composite floor from the vacuum bag assembly.

Although the concepts of the present disclosure are described herein with primary reference to floor construction in recreational vehicles, it is contemplated that the concepts will enjoy applicability to any structural component of a trailer, vehicle, or other application. For example, and not by way of limitation, it is contemplated that the concepts of the present disclosure will enjoy applicability to mobile homes.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
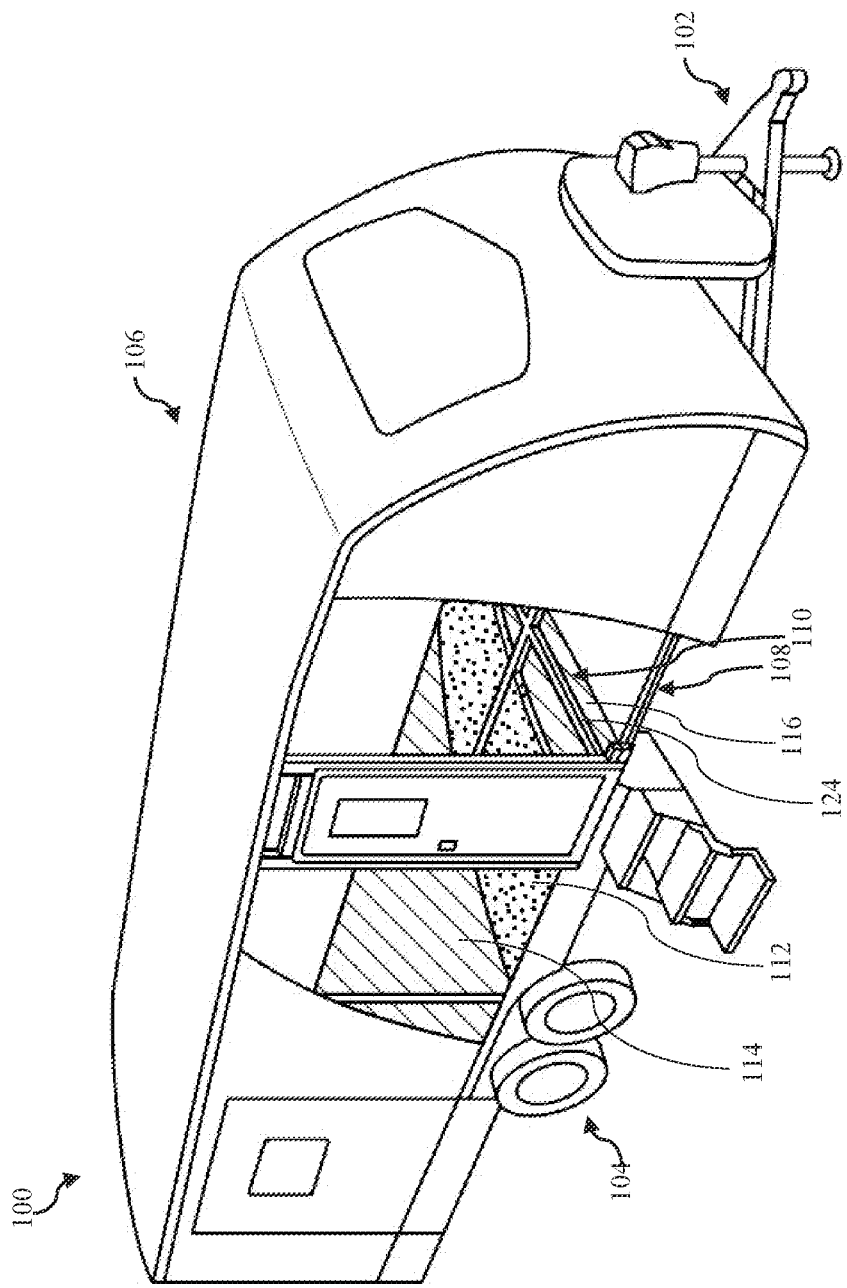
FIG. 1 is a schematic illustration of a recreational vehicle according to one embodiment of the present disclosure.

FIG. 1 illustrates a recreational vehicle 100 comprising a chassis 102, at least one axle assembly 104, a vehicle body 106, and a composite floor 108. With additional reference to FIGS. 2 and 3, the composite floor 108 comprises a skeletal framework 110, a plurality of foam core inserts 112, an impact resistant sheet 114 on an interior side of the composite floor 108, a weather resistant sheet 116 on an exterior side of the composite floor 108, a plurality of contained framework cells 218, and a structural adhesive 320. The skeletal framework 110 of the composite floor 108 comprises a plurality of closed frame sections 222 defined by frame segments 124 of the skeletal framework 110. FIG. 1 is presented for illustrative purposes only and it is noted that the concepts of the present disclosure are not limited to the specific system configurations illustrated therein.

Figure 2:
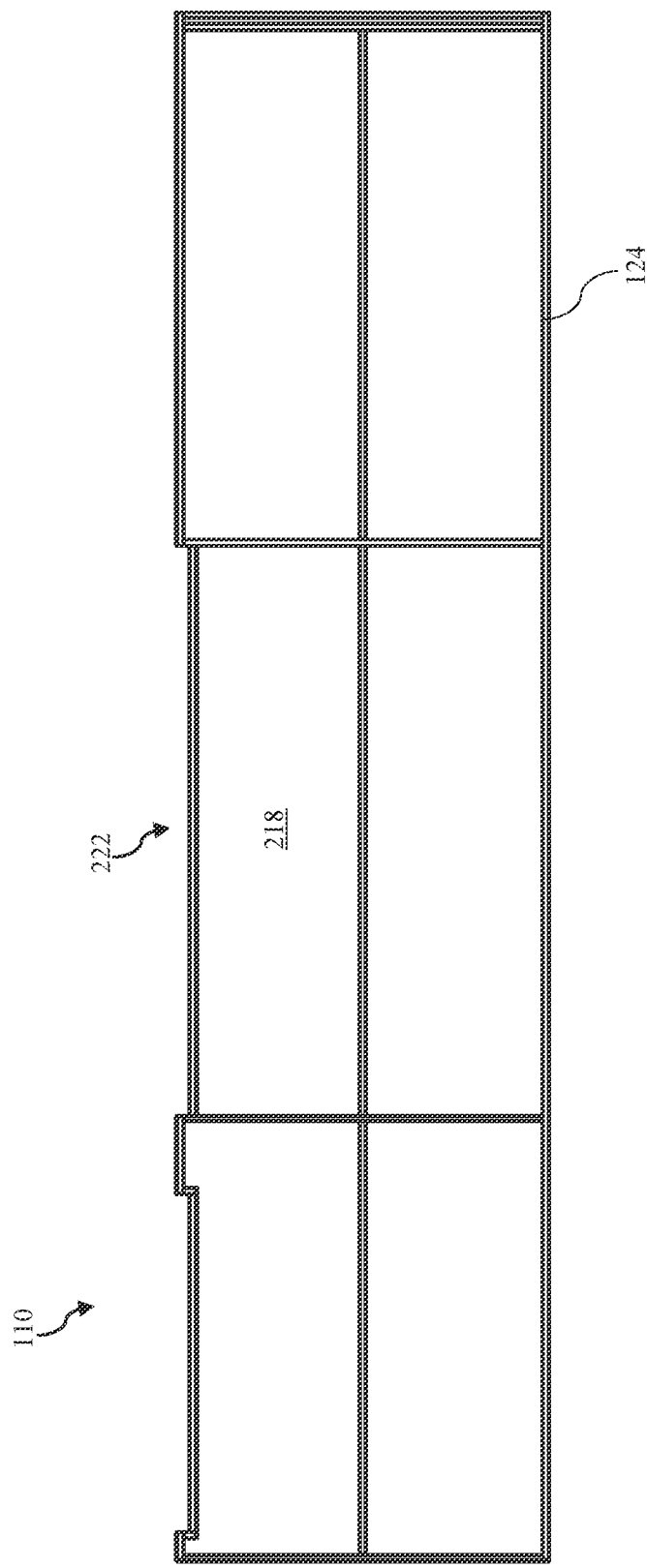
FIG. 2 is a schematic illustration of a skeletal framework of a composite floor according to one embodiment of the present disclosure.
Figure 2A:
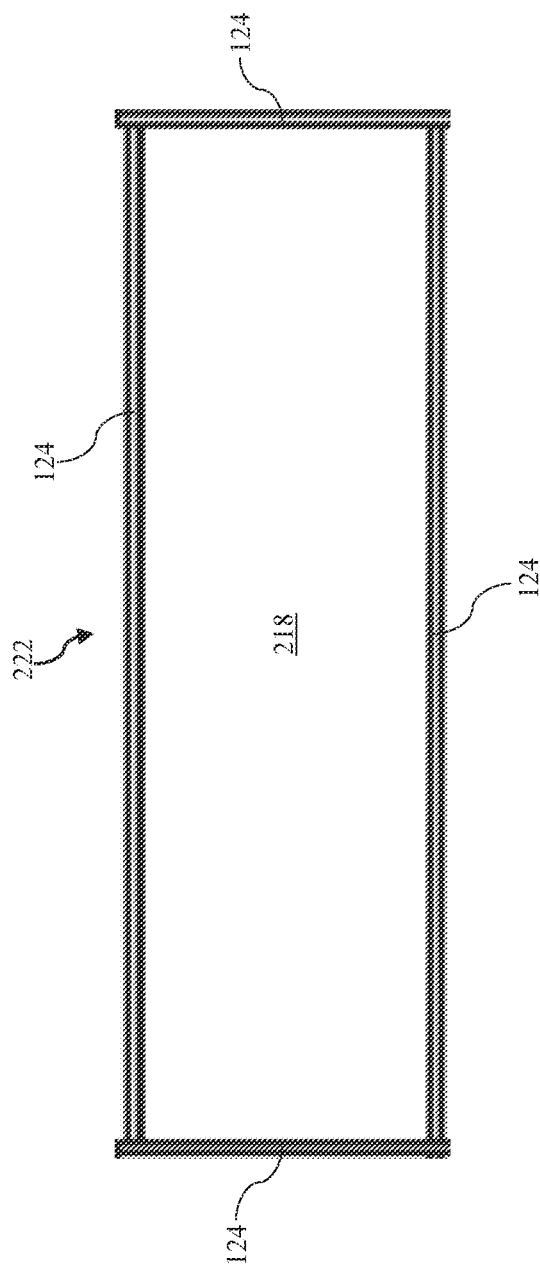
FIG. 2A is a schematic illustration of one closed frame section of a skeletal framework of a composite floor according to one embodiment of the present disclosure.

Referring now to FIGS. 1 and 2, the vehicle body 106 and the composite floor 108 may be supported by the chassis 102. The axle assembly 104 may be coupled to the chassis 102 and provides motive support and underbody clearance to the chassis 102. Each contained framework cell may be bounded volumetrically by frame segments 124 of a closed frame section 222, portions of the impact resistant sheet 114, and portions of the weather resistant sheet 116. Each of the foam core inserts 112 may be large enough to frictionally engage at least two parallel frame segments 124 of a closed frame section 222 of the skeletal framework 110. Each contained framework cell 218 may be packed with one or more of the foam core inserts 112 and the foam core inserts 112 within each cell may collectively occupy a substantial entirety of the contained framework cell 218.

With reference again to FIG. 3, the structural adhesive 320 may be arranged to bond the skeletal framework 110, the foam core inserts 112, the impact resistant sheet, and the weather-resistant sheet as a structurally integrated composite floor 108 where a force exerted on the impact resistant sheet in a direction of a contained framework cell 218 encounters resistance that may be collectively attributable to one or more of the foam core inserts 112, one or more of the frame segments 124 of the skeletal framework 110, and the weather resistant sheet, such that a collective modulus of elasticity (MOE) of the composite floor 108 comprises modulus components that may be attributable to the skeletal framework 110, the foam core inserts 112, the impact resistant sheet 114, and the weather resistant sheet 116.

The collective MOE of the composite floor 108 may be between about 6000 ksi ($4 \times 10^4$ MPa) and about 10000 ksi ($7 \times 10^4$ MPa). The collective MOE of the composite floor 108 may be 8000 ksi ($5.5 \times 10^4$ MPa)±10%.

Referring now to FIGS. 1 and 2, a majority of the closed frame sections 222 of the skeletal framework 110 comprise a planar area of between approximately 1.5 m² and approximately 3.5 m², which is significantly larger than would be available in an aluminum frame composite floor constructed in a different manner, using different materials, like thin plywood and relatively low density foam. Although larger area sections 222 are contemplated, typically, the closed frame sections 222 of the skeletal framework 110 will comprise a maximum planar area of less than approximately 6.0 m². Similarly, although smaller area sections are contemplated, typically, a majority of the closed frame sections 222 of the skeletal framework 110 will comprise a planar area that exceeds approximately 1.0 m².

Referring further to FIGS. 1 and 2, a majority of the closed frame sections 222 of the skeletal framework 110 will comprise an unsupported longitudinal span of between approximately 1.5 m and approximately 4.0 m, which is significantly larger than would be available in an aluminum frame composite floor constructed in a different manner, using different materials, like thin plywood and relatively low density foam. Although larger spans are contemplated, typically, the closed frame sections 222 of the skeletal framework 110 will comprise a maximum unsupported longitudinal span of less than approximately 5.0 m. Similarly, although smaller spans are contemplated, a majority of the closed frame sections 222 of the skeletal framework 110 will comprise a minimum unsupported longitudinal span that exceeds approximately 1.0 m. As used herein, the term "longitudinal" is used to indicate the direction parallel to the longest pair of frame segments 124 in a particular closed frame section 222.

A plurality of the plurality of closed frame sections 222 may lie in a common plane. At least one additional closed frame section 222 may lie in a plane parallel to the common plane. The composite floor 108 may comprise a plurality of closed frame sections 222 and at least one open frame section.

Each of the plurality of foam core inserts 112 may comprise a density of at least about 30 kg/m³±10%. In some embodiments, each of the plurality of foam core inserts comprises a density of between about 30 kg/m³±10% and about 50 kg/m³±10%. Each of the plurality of foam core inserts 112 may frictionally engage at least two pairs of parallel frame segments 124 of a closed frame section 222 of the skeletal framework 110. Each contained framework cell 218 may be packed with a single foam core insert 112 that occupies a substantial entirety of the contained framework cell 218. Each contained framework cell 218 may be packed with a plurality of foam core inserts 112 that collectively occupy a substantial entirety of the contained framework cell 218. A foam thickness defined by the one or more foam core inserts 112 packed in a contained framework cell 218 may be equal to a frame thickness of the frame segments 124 of the closed frame section 222 bounding the contained framework cell. A foam thickness defined by the one or more foam core inserts 112 packed in a contained framework cell 218 may be greater than or less than a frame thickness of the frame segments 124 of the closed frame section 222 bounding the contained framework cell 218.

In some embodiments, each of the plurality of foam core inserts 112 may be sized to fit into a closed frame section 222 of the skeletal framework 110, or, in the alternative, each of the plurality of foam core inserts 112 may be formed in-situ in each closed frame section 222 of the skeletal framework 110.

Again referring to FIG. 3, the structural adhesive 320 may be arranged to bond the skeletal framework 110, the foam core inserts 112, the impact resistant sheet 114, and the weather resistant sheet 116 to define a total composite floor 108 thickness. The impact resistant sheet 114 and the weather resistant sheet 116 may account for less than 20% of the total composite floor 108 thickness. The weather resistant sheet 116 may be characterized by an average sheet thickness that is less than an average sheet thickness of the impact resistant sheet 114 and by an area density that is less than 50% of an area density of the impact resistant sheet 114.

Returning to FIGS. 1 and 2, the sheet thickness of the impact resistant sheet 114 may be 4.00 mm±20%. The sheet thickness of the weather resistant sheet 116 may be 2.7 mm±10%. The area density of the impact resistant sheet 114 may be 2850 g/m²±10%. The area density of the weather resistant sheet 116 may be 1000 g/m²±10%.

The impact resistant sheet 114 and the weather resistant sheet 116 may be fiberglass reinforced polymer sheets. The fiber content of the impact resistant sheet 114 and the weather resistant sheet 116 may be between about 35 wt. % and about 70 wt. %. The impact resistant sheet 114 may comprise a greater fiber content than the weather resistant sheet 116. The impact resistant sheet 114 and the weather resistant sheet 116 may define a fiber content A, representing a difference between a fiber wt. % content of the impact resistant sheet 114 and a fiber wt. % content of the weather resistant sheet 116 that may be at least 20 wt. %. The impact resistant sheet 114 may comprise a fiber content of about 60 wt. % and the weather resistant sheet 116 may comprise a fiber content of about 40 wt. %. For example, in some embodiments, the impact resistant sheet 114 may comprise a fiber content of 64.5 wt. %±2% and the weather resistant sheet 116 may comprise a fiber content of about 42 wt. %±2%.

The impact resistant sheet 114 has a relatively high compression strength and point load characteristics. The impact resistant sheet 114 is suitable for supporting interior components of a recreational vehicle 100 and heavy foot traffic. In some embodiments, the impact resistant sheet 114 may be a multi-layered, fiber-reinforced laminate comprising a first layer fabricated from a thermoplastic composite comprising polypropylene resin reinforced with continuous bi-directional glass fibers, a second layer fabricated from a thermoplastic composite comprising polypropylene resin reinforced with short strand X-Y-Z oriented glass fibers that may be weaved and needled to orient the glass fibers along the three-dimensional axes, a third layer like the first layer, and a woven, adhesion-promoting scrim layer, which may be adhered to the foam core inserts 112. The scrim layer may be provided in a variety of forms including, for example, a resin-impregnated non-woven mat of randomly-oriented fibers. The fibers may be carbon fibers, glass fibers, or synthetic resin fibers. For example, some synthetic fibers that may be used include aramid fibers. The fibers of the scrim layer may also be inorganic fibers such as metal fibers. For example, some metal fibers that may be used include aluminum fibers or titanium fibers.

It should be noted that the composition of the weather resistant sheet 116 may differ from the impact resistant sheet 114. Some of the functional requirements of the weather resistant sheet 116 differ from those of the impact resistant sheet 114. For instance, the weather resistant sheet 116 will be exposed to the exterior environment and, as such, may be more environmentally durable than the impact resistant sheet 114. In some embodiments, the weather resistant sheet 116 may comprise a single polypropylene resin layer reinforced with long strand glass fibers and an adhesion-promoting scrim layer between the reinforced resin layer and the foam core inserts 112. The weather resistant sheet 116 may also be provided with a thin protective film on its exterior-facing side to enhance resistance to moisture and other environmental elements.

Again referring to FIG. 3, the structural adhesive 320 may comprise continuous or discontinuous layers of adhesive between the skeletal framework 110 and the foam core inserts 112 and (i) the impact resistant sheet 114, (ii) the weather resistant sheet 116, or (iii) both.

It is envisioned that, in some embodiments, the composite floor may be bonded with or without the presence additional intervening materials arranged between the impact resistant sheet and the foam core inserts, as well as between the weather resistant layer and the foam core inserts. It is envisioned that such additional intervening materials may further promote adhesion, further enhance structural integrity, or serve any other purpose.

Referring again to FIG. 1, the recreational vehicle 100 may be a towable trailer or a motorized recreational vehicle, such as a motorhome, a fifth wheel camper, a toy hauler, a travel trailer, a teardrop camper, a tiny trailer, a pop-up camper, or any other recreational vehicle. The axle assembly 104 may be a driven or non-driven axle assembly.

Figure 3:
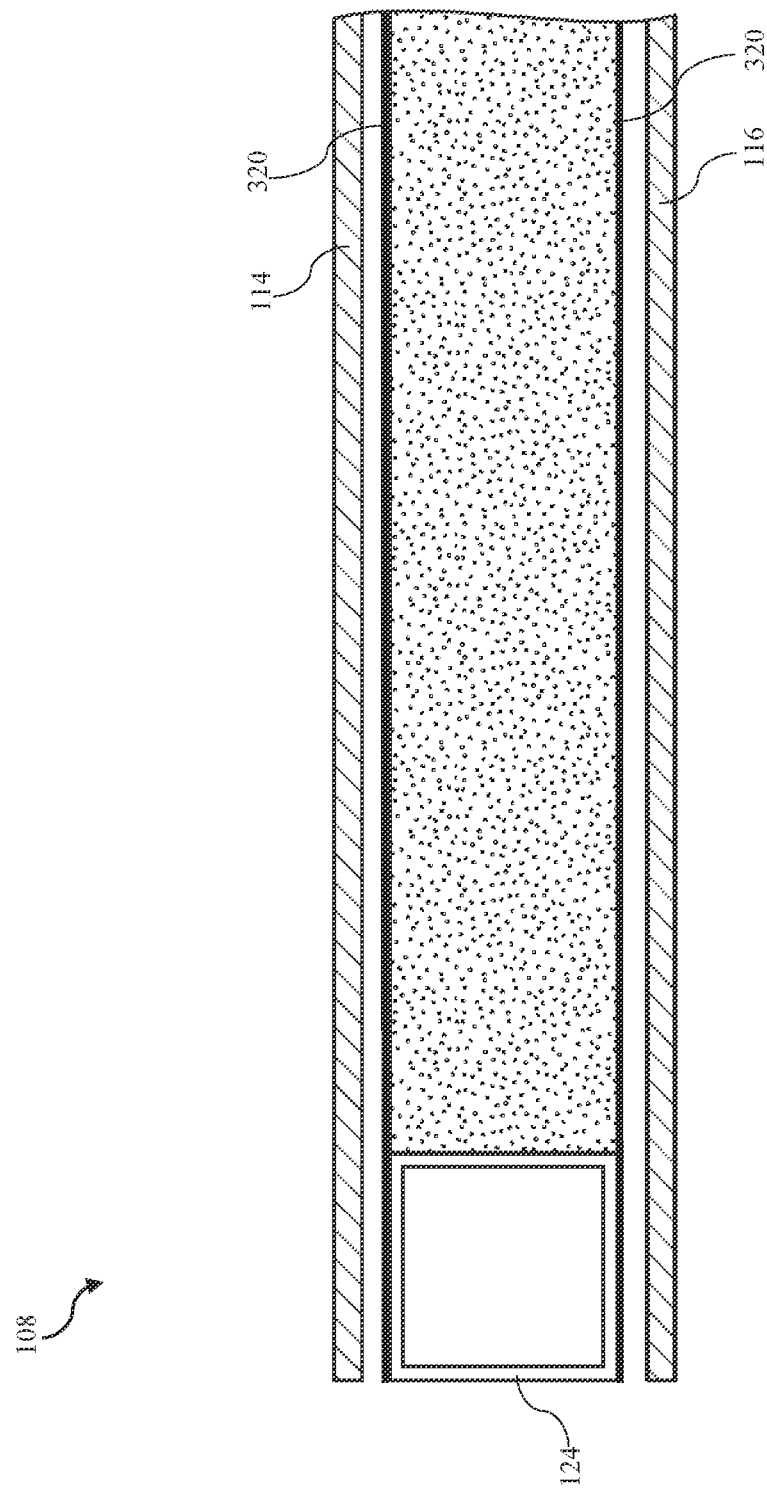
FIG. 3 is a schematic illustration of the components of a composite floor according to one embodiment of the present disclosure.

With reference to FIGS. 1-3, in another embodiment, a method of making a composite floor 108 comprises forming a skeletal framework 110 by assembling a plurality of closed frame sections 222 defined by frame segments 124, inserting one or more foam core inserts 112 into each of the closed frame sections of the skeletal framework 110, providing an impact resistant sheet 114 and a weather resistant sheet 116, each sheet having an internal side and an external side, applying a structural adhesive 320 to the internal side of the impact resistant sheet 114 and contacting the impact resistant sheet 114 with the skeletal framework 110 and foam core inserts 112, applying the structural adhesive 320 to the internal side of the weather resistant sheet 116 and contacting the weather resistant sheet 116 with the skeletal framework 110 and foam core inserts 112, enclosing a composite floor assembly comprising the skeletal framework 110, foam core inserts 112, structural adhesive 320, impact resistant sheet 114, and weather resistant sheet 116 in a vacuum bag assembly, evacuating the vacuum bag assembly of air to compress the composite floor assembly, maintaining a vacuum environment in the vacuum bag assembly to bond each of the impact resistant sheet 114 and the weather resistant sheet 116 to the skeletal framework 110 and foam core inserts 112, returning air to the vacuum bag assembly, and removing the composite floor 108 from the vacuum bag assembly.

For the purposes of defining and describing the present invention, it is noted that the impact resistant sheet 114 is "impact resistant" in the sense that it is sufficiently rigid to protect the foam core inserts 112 from the impact of foot traffic in the interior of the vehicle, without an accompanying layer of carpet padding, carpeting, or other interior floor components.

Each closed frame section 222 of the skeletal framework 110 is packed with at least one of the plurality of foam core inserts 112. For the purposes of the present disclosure it is noted that the term "packed" denotes the insertion of a foam core insert 112 into the volume of space defined by a closed frame section 222, with the understanding that the foam core insert 112 may occupy all or part of the volume, and may extend beyond the volume of the space defined by the closed frame section 222.

The adhesive is described herein as being "structural" only in the sense that it enables the other components of the composite floor 108 to contribute to the collective rigidity of the composite floor 108.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue. For example, reference herein to a foam core insert 112 that occupies a "substantial" entirety of an open section volume is intended to cover instances where quantitatively or functionally insignificant portions of the open section volume are not occupied by the foam core insert 112.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle comprising a composite laminated panel, wherein:
   the composite laminated panel comprises a skeletal framework, a plurality of foam core inserts, an impact resistant sheet on a first side of the composite laminated panel, a weather resistant sheet on a second side of the composite laminated panel, and a plurality of contained framework cells;
   the skeletal framework of the composite laminated panel comprises a plurality of closed frame sections defined by frame segments of the skeletal framework;
   each contained framework cell is bounded volumetrically by frame segments of a closed frame section, portions of the impact resistant sheet, and portions of the weather resistant sheet;
   individual ones of the foam core inserts are large enough to frictionally engage at least two parallel frame segments of a closed frame section of the skeletal framework;
   each contained framework cell is packed with one or more of the foam core inserts and the foam core inserts within each cell collectively occupy a substantial entirety of the contained framework cell; and
   the skeletal framework, the foam core inserts, the impact resistant sheet, and the weather-resistant sheet comprise a structurally integrated composite laminated panel, such that a collective modulus of elasticity (MOE) of the composite laminated panel comprises modulus components that are attributable to the skeletal framework, the foam core inserts, the impact resistant sheet, and the weather resistant sheet.

2. The recreational vehicle of claim 1, wherein the collective MOE of the composite laminated panel is between about 6000 ksi ($4 \times 10^4$ MPa) and about 10000 ksi ($7 \times 10^4$ MPa).

3. The recreational vehicle of claim 1, wherein the collective MOE of the composite laminated panel is 8000 ksi ($5.5 \times 10^4$ MPa)±10%.

4. The recreational vehicle of claim 1, wherein a majority of the closed frame sections of the skeletal framework comprise a planar area of between approximately 1.5 m$^2$ and approximately 4.5 m$^2$.

5. The recreational vehicle of claim 1, wherein the closed frame sections of the skeletal framework comprise a maximum planar area of less than approximately 6.0 m$^2$.

6. The recreational vehicle of claim 1, wherein a majority of the closed frame sections of the skeletal framework comprise a planar area that exceeds approximately 1.0 m$^2$.

7. The recreational vehicle of claim 1, wherein the closed frame sections of the skeletal framework comprise a maximum unsupported longitudinal span of less than approximately 5.0 m.

8. The recreational vehicle of claim 1, wherein a majority of the closed frame sections of the skeletal framework comprise an unsupported longitudinal span of between approximately 1.5 m and approximately 4.0 m.

9. The recreational vehicle of claim 1, wherein a majority of the closed frame sections of the skeletal framework comprise a minimum unsupported longitudinal span that exceeds approximately 1.0 m.

10. The recreational vehicle of claim 1, wherein each of the plurality of foam core inserts comprises a density of at least 30 kg/m$^3$±10%.

11. The recreational vehicle of claim 1, wherein each of the plurality of foam core inserts comprises a density of between about 30 kg/m$^3$±10% and about 50 kg/m$^3$±10%.

12. The recreational vehicle of claim 1, wherein each of the plurality of foam core inserts frictionally engages at least two pairs of parallel frame segments of a closed frame section of the skeletal framework.

13. The recreational vehicle of claim 1, wherein each contained framework cell is packed with a single foam core insert that occupies a substantial entirety of the contained framework cell.

14. The recreational vehicle of claim 1, wherein each contained framework cell is packed with a plurality of foam core inserts that collectively occupy a substantial entirety of the contained framework cell.

15. The recreational vehicle of claim 1, wherein a foam thickness defined by the one or more foam core inserts packed in a contained framework cell is equal to a frame thickness of the frame segments of the closed frame section bounding the contained framework cell.

16. The recreational vehicle of claim 1, wherein a foam thickness defined by the one or more foam core inserts packed in a contained framework cell is greater than or less than a frame thickness of the frame segments of the closed frame section bounding the contained framework cell.

17. The recreational vehicle of claim 1, wherein the impact resistant sheet and the weather resistant sheet account for less than 20% of a total composite laminated panel thickness.

18. The recreational vehicle of claim 1, wherein the weather resistant sheet is characterized by:
    an average sheet thickness that is less than an average sheet thickness of the impact resistant sheet; and
    an area density that is less than 50% of an area density of the impact resistant sheet.

19. The recreational vehicle of claim 18, wherein:
    the sheet thickness of the impact resistant sheet is 4.00 mm±20%;

the sheet thickness of the weather resistant sheet is 2.7 mm±10%;

the area density of the impact resistant sheet is 2850 g/m$^2$±10%; and the area density of the weather resistant sheet is 1000 g/m$^2$±10%.

20. The recreational vehicle of claim 1, wherein:

the impact resistant sheet and the weather resistant sheet are fiberglass reinforced polymer sheets;

the fiber content of the impact resistant sheet and the weather resistant sheet is between about 35 wt. % and about 70 wt. % and impact resistant sheet comprises a greater fiber content than the weather resistant sheet; and the impact resistant sheet and the weather resistant sheet define a fiber content A, representing a difference between a fiber wt. % content of the impact resistant sheet and a fiber wt. % content of the weather resistant sheet that is at least 20 wt. %.

21. The recreational vehicle of claim 1, wherein:

the impact resistant sheet and the weather resistant sheet are fiberglass reinforced polymer sheets;

the impact resistant sheet comprises a fiber content of about 60%; and the weather resistant sheet comprises a fiber content of about 40%.

22. A recreational vehicle comprising a composite laminated panel, wherein:

the composite laminated panel comprises a foam core insert, an impact resistant sheet on a first side of the composite laminated panel, a weather resistant sheet on a second side of the composite laminated panel, and a structural adhesive;

the structural adhesive is arranged to bond the foam core insert, the impact resistant sheet, and the weather-resistant sheet as a structurally integrated composite laminated panel;

each of the plurality of foam core inserts comprises a density of at least 30 kg/m$^3$±10%;

the impact resistant sheet and the weather resistant sheet account for less than 20% of the total composite laminated panel thickness;

the weather resistant sheet is characterized by an average sheet thickness that is less than an average sheet thickness of the impact resistant sheet and an area density that is less than 50% of an area density of the impact resistant sheet;

the sheet thickness of the impact resistant sheet is 4.00 mm±20%;

the sheet thickness of the weather resistant sheet is 2.7 mm±10%;

the area density of the impact resistant sheet is 2850 g/m$^2$±10%;

the area density of the weather resistant sheet is 1000 g/m$^2$±10%;

the impact resistant sheet and the weather resistant sheet are fiberglass reinforced polymer sheets;

the fiber content of the impact resistant sheet and the weather resistant sheet is between about 35 wt. % and about 70 wt. % and the impact resistant sheet comprises a greater fiber content than the weather resistant sheet; and the impact resistant sheet and the weather resistant sheet define a fiber content A, representing a difference between a fiber wt. % content of the impact resistant sheet and a fiber wt. % content of the weather resistant sheet that is at least 20 wt. %.

\* \* \* \* \*